3,029,143
RECOVERY OF MERCURY FROM BRINE CONTAINING MERCURY SALTS IN SOLUTION
Robert S. Karpiuk and John J. Hoekstra, Midland, Mich., assignors to The Dow Chemical Company, Midland, Mich., a corporation of Delaware
No Drawing. Filed Mar. 9, 1960, Ser. No. 13,719
5 Claims. (Cl. 75—109)

The invention is concerned with the recovery of mercury metal from aqueous solutions containing mercury compounds in solution. It is especially concerned with the recovery of mercury metal from brine, as from the spent brine from a chlorine-producing electrolytic cell employing a mercury cathode, hereinafter referred to as a mercury chlorine cell.

It is, naturally, a desirable objective to recover mercury metal from spent aqueous solutions containing mercury compounds. Among such aqueous solutions are effluent brine from mercury chlorine cells which usually contain, for example, anywhere from 1 to 50 parts per million of mercury therein. Since chlorine is produced in large volumes by means of cells employing a mercury cathode, any appreciable concentration of mercury in the effluent brine amounts to a large annual economic loss.

Attempts have been made to provide a method which attains this desirable objective. Such attempts include subjecting the effluent brine containing mercury (1) to the action of a water-soluble sulfide of a metal or hydrogen thereby to produce mercury sulfides and thereafter recover the mercury therefrom, (2) to the action of iron pieces or turnings wherein the mercury in the solution is replaced by the iron and the thus replaced mercury settled out, and (3) to the action of formaldehyde which reduces the Hg ions therein to metallic mercury.

Known methods of recovering the mercury from brines containing compounds thereof are not fully satisfactory. For example, $Hg_2S$ and/or $HgS$ formed when a sulfide is used, is colloidal and very difficult to cause to coalesce; iron compounds are formed in the brine when metallic iron or steel is used in the recovery of mercury and furthermore since iron or steel of commercial grade is seldom of high purity, there usually results some contamination of both the brine and the mercury produced, particularly by multivalent metals, e.g., vanadium; a particularly finely-divided mercury is produced when formaldehyde is employed as a reducing agent and, similarly to the sulfide process, coalescence of the mercury is extremely difficult, particularly in plant-size operations.

A need, therefore, exists for an improved method of recovering mercury from aqueous solutions containing mercury compounds which method is economical and has not associated therewith serious problems of coalescing and collecting the mercury sought to be obtained.

The principal object of the invention, accordingly, is to provide such method. The steps by which this and related objects are attained is set out in the ensuing description and is particularly defined in the appended claims.

The invention is a method of recovering mercury from aqueous solutions containing compounds thereof by passing the solution and a liquid alkali metal amalgam concurrently through a bed, preferably a vertical column, of steel turnings or pieces, preferably first amalgamated, whereby the mercury component of the mercury compounds therein is caused to form additional metallic mercury and/or diluted amalgam, some of which adheres to the surface of the amalgamated steel pieces or turnings and some of which drips from the surface of the turnings to the lower part of the bed or column and collects there from which it can be subsequently removed.

Although it is not necessary, in the practice of the invention, to amalgamate the steel pieces prior to packing the column (since they become amalgamated by passing the brine therethrough containing mercury) a more uniform flow pattern and better use of all the steel pieces results when the pieces are amalgamated before use. The alkali metal amalgam is passed downwardly through the bed of steel pieces, but the brine may be passed either downwardly with the flow of the amalgam; or it may be passed upwardly, i.e., in a countercurrent direction.

In practicing the invention, the aqueous solution hereinafter referred to as a brine, may be passed either into the top or into the bottom of the bed or column of steel turnings. The steel pieces or turnings employed in the practice of the invention may be any alloy containing at least about 99 percent iron and may be of any size or shape so long as interstitial spaces are provided for the passage therethrough of the brine and amalgam. The particular steel alloy or sizes of the pieces employed are not critical but cold rolled steel pieces such as the irregular shaped turnings produced by a lathe and having their greatest dimension not over about ¼ to ½ inch and thickness of between about 0.001 and 0.375 inch are commonly employed. It is recommended that the bed of steel pieces or turnings have a depth of between 2 and 30 inches, a depth of 15 to 20 inches being usually employed. A series of beds or columns of the steel pieces or turnings may be advantageously employed when a particularly Hg-free brine is desired.

Any aqueous solution containing mercury compounds dissolved therein in an amount sufficiently large to make the recovery therefrom economically practical may be employed in the practice of the invention. Spent brine from mercury chlorine cells contains varying amounts of soluble salts therein, chiefly the halides of alkali metal and alkaline earth metals but with lesser amounts of other less soluble salts and some mercury salts, the recovery of the last being a principal object of the invention.

The amalgam employed in the practice of the invention may be any alkali metal amalgam having a concentration of alkali metal therein between about 0.1 weight percent and the saturation point at the temperature of the amalgam. The amalgam usually employed in the practice of the invention has a saturation point of about 0.6 percent sodium at 20° C. and of about 1.0 percent at 70° C. Sodium amalgam is usually employed because it is readily available and can be conveniently supplied directly from a chlorine cell, which is preferably either the same cell or one located near to the one from which the brine is supplied. The percent sodium in the sodium amalgam usually varies from 0.01 to 0.6 percent inclusive. The preferred percentage of sodium in the sodium amalgam is 0.05 to 0.2, e.g., about 0.1 percent. At sodium concentrations in the amalgam approaching 0.01 percent on the one hand and 0.6 percent on the other hand, the efficiency of the mercury removal in accordance with the practice of the invention noticeably decreases and below 0.01 percent sodium or at temperatures approaching the saturation point, 0.7 percent and above, the mercury removal is unsatisfactory.

The flow rate of brine through the bed or column of steel pieces or turnings is usually between about 10 gallons per minute per square foot of cross section of the bed to about 70 gallons per minute per square foot cross-section of the bed. Lower brine flow rates result in an uneconomical throughput of brine and higher flow rates are accompanied by a decrease in the efficiency of the mercury removal. The preferred flow rate is between about 35 and 40 gallons per minute per square foot of cross-section of the bed or column of the steel pieces or turnings.

The alkali metal amalgam flow rate is dependent upon the rate of flow of the brine and upon the average mercury content of the brine. The flow of the amalgam, e.g., sodium amalgam produced in a mercury-chlorine cell, is usually between about 5 percent and 20 percent of the brine flow by weight per unit of time. A particularly effective ratio of flow rates of the amalgam to brine has been found to be between about 0.08 and 0.09 amalgam to 1 of brine, e.g., 30 pounds of amalgam and 334 pounds of brine per minute per square foot cross-section of the bed of steel turnings. The temperature of the brine and amalgam being passed through the bed of steel pieces or turnings either amalgamated or not is not highly critical. Any temperature between 0° and 100° C. is operable. For practical purposes, the temperature is usually that of the temperature of the mercury chlorine cell effluent, e.g., between 50° and 85° C.

The following example is illustrative of the practice of the invention:

A glass jacketed cylinder, composed of Pyrex having a height of about 40 inches and a diameter of about 2 inches, a sodium amalgam inlet at the top, a brine inlet near the top, a sodium amalgam and a mercury outlet at the bottom thereof and a brine outlet about 7 inches from the bottom was set up. The mercury outlet was provided with a valve to control the outflow of mercury therefrom. The Pyrex cylinder was also provided with a perforate support therein about 7 inches above the brine outlet. Steel turnings, produced from lathe working of cold rolled steel, about ¼" in average width and about 1/36" in average thickness, were amalgamated by dipping them in a bath of sodium amalgam. The thus amalgamated steel turnings were then placed on the support in the cylinder to a depth of 15 inches. Spent brine and sodium amalgam supplied from an operating mercury chlorine cell were then admitted concurrently by means of individual tubes leading from the electrolytic chamber, respectively, of the chlorine cell to the respective inlets therefor at or near the top of the cylinder. As the brine and sodium amalgam passed downwardly through the bed of amalgamated steel turnings, mercury metal was recovered from the brine as it came in contact with the steel pieces from which it dripped or drained, and accumulated in the portion of the Pyrex cylinder below the brine outlet. A small amount of the first brine introduced rested on top of the thus recovered mercury but thereafter it flowed out the side outlet provided therefor located above the mercury. After a small amount of mercury had accumulated in the lower portion of the cylinder, the valve in the mercury outlet was opened sufficiently to drain away the mercury at a rate, which allowed a small accumulation thereof to remain in the cylinder upon which the brine fell and was thus directed out the side outlet for brine. Mercury-depleted brine and mercury including any excess of partially spent sodium amalgam were led back to the chlorine cell by means of tubes connected to the respective outlets. 11.9 gallons of brine, having a mercury concentration of 15.4 parts per million, and 9.8 pounds of sodium amalgam having a sodium content of 0.094 percent were passed through the bed of amalgamated steel turnings at an average rate of 334 pounds of brine and 29.9 pounds of amalgam per minute per square foot of cross-section of the bed of amalgamated steel turnings. The temperature of the brine in the chlorine cell was 63° C. and was maintained at about that temperature, while the mercury was being removed therefrom, by passing water through the jacket of the Pyrex cylinder. Examination of the brine, after passing it through the steel turnings in accordance with the invention, showed a reduction in mercury content from 15.4 parts per million to 3.3 parts per million. This was about a 78.6 percent removal of mercury from the brine in a single pass. If a greater reduction of the mercury content were desired, the brine and additional sodium amalgam could have been removed by being passed through the column again or through a series of similarly constructed columns.

An examination of the example shows clearly that the invention is effective to remove mercury from brines containing mercury compounds.

A number of advantages flow from the practice of the invention, among which are: the alkali metal amalgam employed in the practice of the invention is preferably sodium amalgam which is readily obtained from the same or similar chlorine cells from which the brine, containing the mercury to be recovered therefrom, is obtained; the mercury-depleted brine and the sodium amalgam and mercury used therein are both returned to the cell with no net appreciable loss; no contaminants are added to the brine by the practice of the invention; a coalescing medium, viz., the sodium amalgam or mercury, or recovered mercury adhering thereto, is present in the process and no problem of coalescing the mercury being recovered is presented; the cost of the recovery of the mercury from the effluent brine of a chlorine cell is only a small fraction of the value of the mercury thus recovered.

Having described the invention, what is claimed and desired to be protected by Letters Patent is:

1. The method of recovering mercury from an aqueous solution containing mercury compounds dissolved therein consisting of passing said solution at a temperature of between 0° and 100° C. concurrently with a liquid alkali metal amalgam through at least 2 inches of a bed of steel pieces to form amalgam thereon and thereafter continuing to pass said solution therethrough, at a flow rate of said brine of between 10 and about 70 gallons per minute per square foot of cross-section of said bed, said amalgam having a metal content of at least 0.01 and not exceeding the saturation point thereof in the amalgam, to reduce the mercury compounds therein to metallic mercury, and recovering the mercury thus formed.

2. The method of recovering mercury from an aqueous solution containing mercury compounds dissolved therein consisting of passing said solution at a temperature between 20° and 80° C. concurrently with sodium amalgam having a sodium content of between 0.01 and 0.6 weight percent through a bed of amalgamated steel turnings having a depth of between about 15 and 20 inches and having the smallest dimensions not less than about 0.001 inch and the largest dimensions not more than about 0.75 inch, and composed of an alloy consisting of not less than about 99 percent iron, at a flow rate of said brine of between 24 and 36 gallons per minute per square foot of cross-section of said bed to reduce the mercury compounds in said solution to metallic mercury, and thereafter recovering the mercury thus reduced.

3. The method of claim 2 wherein the brine so treated and additional alkali metal amalgam are passed repeatedly through said bed.

4. The method of claim 2 wherein the brine is passed through a series of said beds.

5. The method of recovering mercury from the brine effluent from the electrolytic chamber of a mercury chlorine cell consisting of passing said brine concurrently with sodium amalgam from a mercury chlorine cell at least once through at least one column of steel pieces at least about 5 inches deep at a flow rate of said brine of not over about 70 gallons per minute per square foot of cross-section of said bed, to cause mercury from said compounds in the brine to adhere and thereafter at least a portion thereof to drip and drain from said pieces through said bed to a restricted zone therebelow, accumulating some of the mercury thus removed from the brine to maintain a controlled level in said zone below said bed, drawing off the brine thus treated at a point below said bed and above said mercury level, and returning the thus treated brine and mercury in excess of that required to maintain said level to a mercury chlorine cell.

References Cited in the file of this patent
UNITED STATES PATENTS

| | | |
|---|---|---|
| 2,703,752 | Glasser et al. | Mar. 8, 1955 |
| 2,732,284 | Sakowski | Jan. 24, 1956 |
| 2,860,952 | Bergeron et al. | Nov. 18, 1958 |

FOREIGN PATENTS

| | | |
|---|---|---|
| 756,205 | Great Britain | Mar. 16, 1954 |

OTHER REFERENCES

Mellor: Comprehensive Treatise on Inorganic and Theoretical Chemistry, vol. 4, Longmans, Green and Co., London, 1923, page 1019 relied on.